United States Patent [19]
Raymond et al.

[11] Patent Number: 5,826,543
[45] Date of Patent: Oct. 27, 1998

[54] CLUMPABLE ANIMAL LITTER CONTAINING A DUST REDUCING AGENT

[75] Inventors: Marvin L. Raymond, Cape Girardeau; Phillip B. Greene, Scott City; Thomas M. Harrison, Cape Girardeau, all of Mo.

[73] Assignee: Ralston Purina Company, St. Louis, Mo.

[21] Appl. No.: 375,860

[22] Filed: Jan. 20, 1995

[51] Int. Cl.$^6$ .................................................. A01K 1/015
[52] U.S. Cl. ............................................................ 119/173
[58] Field of Search .................................. 119/171, 172, 119/173

[56] References Cited

U.S. PATENT DOCUMENTS

| | | | |
|---|---|---|---|
| 3,838,064 | 9/1974 | Vogt et al. ............................. | 252/384 |
| 3,838,092 | 9/1974 | Vogt et al. ............................. | 260/33.6 F |
| 3,974,089 | 8/1976 | Owen et al. ............................ | 252/384 |
| 3,993,584 | 11/1976 | Owen et al. ............................ | 525/383 |
| 5,176,107 | 1/1993 | Buschur ................................. | 119/173 |
| 5,183,010 | 2/1993 | Raymond ............................... | 119/172 |
| 5,193,489 | 3/1993 | Hardin ................................... | 119/173 |
| 5,196,473 | 3/1993 | Valenta et al. .......................... | 524/445 |
| 5,469,809 | 11/1995 | Coleman ................................. | 119/173 |

*Primary Examiner*—Gene Mancene
*Assistant Examiner*—Thomas Price
*Attorney, Agent, or Firm*—Richard B. Taylor

[57] ABSTRACT

A litter composition and a method for manufacturing a litter composition including a clumpable litter product coated with PTFE in order to reduce dustiness of the litter product. In one embodiment, the litter product contains a sodium bentonite clay substrate in combination with the PTFE additive. In another embodiment, the litter product contains a mixture of calcium bentonite clay and a guar gum additive in order to provide a clumpable litter product. According to one method, a water dispersion of a PTFE resin is sprayed onto the mixture clay product while the product is falling through the air to form fibers which attract and trap dust particles emitted from the clay mixture without causing premature clumping of the mixture.

18 Claims, 2 Drawing Sheets

CLUMPABLE ANIMAL LITTER CONTAINING A DUST REDUCING AGENT

BACKGROUND OF THE INVENTION

The present invention relates generally to litter compositions for absorbing animal wastes, and more particularly to a litter composition that agglomerates into a mass upon contact with a liquid.

Animal litter compositions, such as cat litter, are well known for collecting urine and feces of housebroken animals. Conventional litter compositions include absorbent materials such as clays, paper, wood chips, organic fiber, etc. When odors from the animal waste in the litter become objectionable, the fecal matter may be physically removed from the litter. However, in order to remove the odors caused by the urine, it has been necessary to discard the entire litter composition, including the unsoiled litter, and replace the litter box with fresh litter.

In order to reduce the inconvenience and expense of replacing the entire litter material, recent litter compositions have included substances that agglomerate or gel when wetted to form a mass, thereby permitting the soiled litter to be conveniently separated from the unsoiled litter. Such substances include swelling clays such as sodium bentonite and other swelling montmorillonites. Other non-swelling litter substrates, such as calcium bentonite and others may agglomerate or gel by the addition of additives, such as starch, as proposed in U.S. Pat. No. 5,183,010 or guar gum, as proposed in U.S. Pat. No. 5,193,489.

A problem with litter products containing a binder additive is that the additive tends to separate from the litter substrate, resulting in litter regions that are incapable of clumping upon contact with the litter product. Although it is possible to mix the binder and substrate into a pelletized litter product, this is a relatively expensive process, which is incompatible in the highly cost competitive business of animal litter sales. In addition, such litter products are known to exhibit dustiness upon handling.

Although sodium bentonite clays are advantageous in that they clump upon contact with water, they have a disadvantage of generating a great deal of dust upon handling due to their small particle size.

The problem of dust generated from particulate materials is not a new problem. Many attempts have been made to bind the dust in some manner and to control it to some extent. For example, U.S. Pat. No. 5,196,473 proposes to add a water dispersible non-ionic vinyl polymer which is sprayed in an aqueous vehicle onto the normally dusty particulate litter granules in an amount sufficient to reduce dusting of the inorganic material. Such vinyl polymers include polyvinyl acetate, partially hydrolyzed polyvinyl acetate, and mixtures thereof.

An alternative method of controlling dust is to use fibrillatable polytetrafluoroethylene (hereafter referred to as PTFE) for reducing the dust in powdery paint pigments that are pelletized. In particular, U.S. Pat. No. 3,838,064 (the '064patent) proposes the use of PTFE in two types of resin forms, a fine powder and a colloidal aqueous dispersion. As a fine powder resin, the PTFE is homogeneously dispersed in the high dust particles (e.g., via a Waring blender). The blend is then subjected to a working action at a temperature from about 50° F to 150° F (e.g., via a slow-speed electrical mixer) until the dusting of the powder has been sufficiently reduced. At this point, the network of submicroscopic fibers of PTFE has been distributed throughout the entire mass of the high dusting material to hold the high dusting particles loosely in an agglomerate. According to the '064 patent, heating the PTFE is required in order to form the fibers in fibrillatable form. An optimum heating temperature is given as 100° C. The '064 patent acknowledges that this "dry" method of homogeneous dispersion may be difficult due to mixing and dusting problems.

In the wet process proposed in the '064 patent, a colloidal aqueous dispersion of PTFE or a fine powder PTFE is slurried with the high dusting material in a "liquid processing aid"(i.e., water) in a mechanical blender to effect a homogeneous dispersion of PTFE in a mixture. The liquid processing aid is then separated from the solid, resulting in a homogeneous mass that is then dried. The dried mass containing the PTFE is then heated to a temperature between 50° C and 200° C and worked to effect fibrillation of the PTFE to achieve the desired degree of dustlessness. The '064 patent also proposes a modification of the wet process by working the homogeneous mass in a spray drier instead of a mechanical blender to form a spray-dried powder that is similar to the high dusting material except that it allegedly exhibits significantly reduced dust.

Several subsequent related patents propose various modifications to the '064 patent. For example, U.S. Pat. No. 3,838,092 proposes a dustless agglomerate (e.g. a pellet) formed from particles ranging in size from about 1 micron to about 400microns. U.S. Pat. Nos. 3,974,089 and 3,993,584 also propose the use of PTFE to reduce dustiness.

The processes described in the '064 and related patents all require that the high dusting material be worked in water to mix the PTFE therewith. Although this method of application may be adequate for high-dusting foodstuffs, such as dissolvable powders and the like, such methods are wholly inadequate for use with absorbent animal litters that are designed to agglomerate into a mass upon contact with a liquid. These known methods of incorporating PTFE into a high dusting material would result in premature clumping of the litter. Therefore, it is desired to provide a reduced dusting clumpable litter product and a method of applying a reduced dusting agent to a clumpable litter product to reduce the amount of airborne dust generated by the product without premature clumping of the litter.

SUMMARY OF THE INVENTION

The present invention provides a litter product that agglomerates into a mass upon contact with a liquid and contains an appropriate quantity of PTFE dispersed throughout the litter product to substantially inhibit the amount of airborne dust particles emitted by the litter product upon handling. The present invention pertains to both swellable litters, such as sodium montmorillonite clay and non-swellable litters, such as calcium montmorillonite clay which include an additive for binding the litter upon contact with a liquid. According to a process of the present invention, the use of PTFE in conjunction with the binder aids in preventing the binder from separating from the litter substrate.

In accordance with one method of the present invention, PTFE is sprayed onto a sodium bentonite clay to reduce the dustiness of the clay. Fine particles of PTFE (less than 50microns) are dispersed in water with the aid of a surfactant. This aqueous dispersion is sprayed onto the clay while the clay is in motion to expose most of the surface area of the clay to the spray. While each clay particle is being sprayed, the particle is preferably not in contact with adjacent particles thereby preventing premature clumping of the litter as well as exposing as much of the surface area as possible to the spray. One manner in which this may be achieved is to spray the clay in a chamber while the clay is falling through the air.

In one embodiment, the clay particles are sprayed with a dispersion of PTFE in a chamber after the clay has fallen down in an air ladder, a device that allows the clay to cascade down while air is pulled up in a countercurrent direction to the flow of the clay. The air ladder pulls off much of the dust from the clay. At the bottom of the air ladder, the clay passes through a chamber at which point the PTFE aqueous dispersion is sprayed onto the clay. The spray occurs as the clay is still dropping through the air, which enables the PTFE dispersion to coat the surfaces of the clay particles without causing premature clumping of the litter.

In accordance with another embodiment of the present invention, the PTFE resin is applied to a non-swelling litter substrate, such as calcium montmorillonite. After application of the PTFE in the manner described above, a binder such as guar gum, is mixed with the clay in a ribbon blender or other similar mixing device. If desired, additional PTFE may then be sprayed onto the mixture to allow some natural drying and absorbing of excess water to take place.

An advantage of the litter composition of the present invention is that the dust exhibited from a clumpable litter product is significantly reduced.

Another advantage of the litter composition of the present invention is that the PTFE aids in preventing the binder additive from separating from the litter substrate.

Another advantage of the litter composition of the present invention is that a water dispersion of PTFE may be applied to a clumpable litter product without causing premature clumping of the product.

The present invention, in one form thereof, comprises a substantially reduced dusting litter composition capable of agglomerating upon contact with a liquid that is deposited in the composition to facilitate removal of the liquid from a container containing the litter composition. The litter composition comprises a sodium montmorillonite clay and a fibrillatable polytetrafluoroethylene resin distributed on the clay in an amount sufficient to retain dust particles on the clay. In another embodiment, the litter composition comprises a non-swellable particulate litter substrate and a fibrillatable polytetrafluoroethylene resin distributed on the particulate litter substrate in an amount sufficient to retain dust particles on the substrate. In this embodiment, a particulate binder is dispersed throughout the litter substrate in an amount sufficient to enable the PTFE coated substrate to agglomerate.

Another embodiment of the present invention comprises a method of preparing a substantially reduced dusting litter composition comprising sodium montmorillonite clay. The method comprises the steps of removing a substantial amount of dust from the clay in an air ladder. The next step is to spray a polytetrafluoroethylene dispersion onto the clay while the clay is falling through the air in a chamber at the bottom of the air ladder to form a random network of fibers about the clay to substantially inhibit the amount of airborne dust particles emitted from the clay upon handling. By spraying the clay while the clay is falling through the air, premature clumping of the clay is minimized. In another embodiment, the method includes spraying a dispersion of polytetrafluoroethylene onto a non-swelling particulate litter substrate, such as calcium montmorillonite. Thereafter, the method includes mixing a binder, such as guar gum, with the litter substrate material in an amount sufficient to enable the litter substrate material to agglomerate upon contact with the liquid that is deposited in the litter substrate.

DESCRIPTION OF THE PREFERRED EMBODIMENTS

Figure 1:
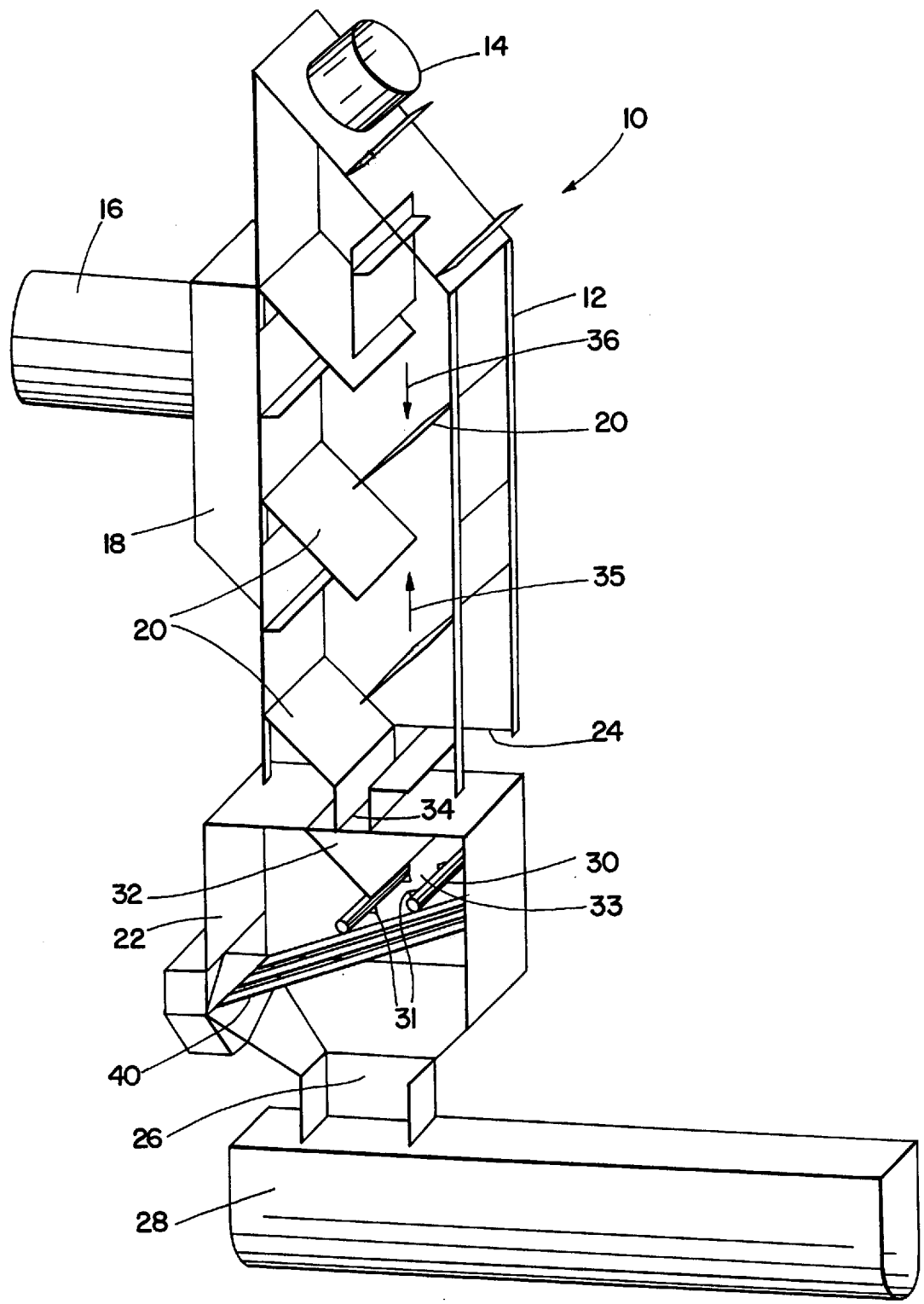
FIG. 1 is a perspective view of an air ladder, PTFE application chamber, and blender, in accordance with one embodiment of the present invention.

In accordance with a feature of the present invention, a reduced dusting litter composition is provided which may be used in litter boxes or cages of household pets such as cats, hamsters, gerbils, guinea pigs, etc. In addition, the litter composition may be useful for other pets such as rabbits and ferrets, as well as laboratory animals such as rats and monkeys.

The particulate absorbent material which composes the highest percentage by weight of the litter composition may be mineral absorbents, such as clays, zeolites, silicates, sand, etc. The clays may be swelling clays such as sodium montmorillonite or non-swelling clays, such as calcium montmorillonite. In addition, the absorbent material may be non-mineral absorbents, such as corn cob granules, paper, wood chips, organic fiber, peanut hulls, alfalfa, bark, straw, sawdust, etc.

In accordance with one embodiment of the present invention, a fibrillatable polytetrafluoroethylene (hereafter referred to as PTFE) is added to sodium montmorillonite, particularly sodium bentonite clay. In order to prepare the PTFE for application onto the sodium bentonite clay, an aqueous dispersion of PTFE is prepared. One such PTFE dispersion is commercially available from E .I. DuPont in concentrate form under the trade name Teflon K Type 20 Particle Control Additive. This concentrate comprises about 33%, by weight, PTFE particles or solids (particle size being 50 microns or less), about 1% surfactant, and about 66% water. The surfactant in Teflon K Type 20 is octylphenoxy polyethoxy ethanol, sold under the trade name TRITON X-100, also commercially available from E. I. DuPont. The concentrated PTFE dispersion may be diluted in water in a mix ratio of one part PTFE dispersion concentrate to 13.4 parts water. All parts are by weight. A suitable dilution can be in the range from one part PTFE to 10 parts water to one part PTFE to 20 parts water.

In one embodiment, the PTFE is applied to both sodium bentonite clay and a calcium montmorillonite clay to provide a mixed clay for use as the final litter product. The percentage ratio by weight of sodium bentonite clay/calcium montmorillonite clay may range from 0/100 to 50/50.

Before applying the diluted aqueous dispersion of PTFE, it is desired to remove as much dust as possible by causing the clay particles to cascade down through an air ladder while the air is pulled upwardly in a countercurrent direction to the flow of the clay. Much of the airborne dust in the clay is caught up in the countercurrent airflow to remove the dust from the clay particles. At the bottom of the air ladder, the clay particles fall into a chamber wherein the diluted aqueous dispersion of PTFE is then sprayed onto the clay. This dilution is sprayed onto the clay in the range of 10 to 20 pints of liquid per ton of clay. An illustrative spray rate is 15 pints per ton. The clay particles are sprayed while falling within the chamber so that premature clumping of the litter product is avoided.

The PTFE dispersion may be applied at a rate of 0.010 to 0.20 percent solid PTFE particles per ton of clay. The final clay product may contain from 0.2 to 4.0 pounds PTFE solid particles per ton of clay. It has been found that the application of too much PTFE results in a product that tends to repel water, rendering the product unsuitable for use as an animal litter product. The PTFE dispersion is applied at room temperature, i.e. about 70°—80° F. No heating of the dispersion is required prior to spraying. The mechanical action of spraying the PTFE dispersion onto the blend results in the formation of fibers of PTFE which attract and trap dust particles within the blend. The moisture of the PTFE dispersion is absorbed into the clay substrate. This method has been found to prevent the clumping of the litter blend during application of the PTFE dispersion.

In accordance with another embodiment of the present invention, a litter composition comprising a non-swelling substrate, such as calcium montmorillonite clay is sprayed with the PTFE dispersion in the manner described above. After the PTFE spray has been applied to the clay in the chamber, the clay particles immediately drop into a blender for dry mixing with a binder. The binder may be one of a variety of substances, including but not limited to polyacrylate, starch, or guar gum. Upon encountering a liquid substance, the binder agglomerates the surrounding litter materials into a stable mass or clump that can be easily removed from the dry litter.

The addition of PTFE and guar gum to a calcium montmorillonite clay substrate results in a small granular animal litter that exhibits significantly reduced dusting as well as results in a litter which experiences significantly less separation or segregation of the dry additives that are blended together to enable the litter to experience the desirable clumping properties. The particle size of the calcium montmorillonite clay generally ranges from 2000 to 250 microns. Since this clay is a natural material mined from the ground, the clay also contains small amounts of other minerals, such as quartz, feldspar, gypsum, and/or micas. However, these minerals do not effect the binding function of the guar gum.

It will be appreciated that any non-swelling absorbent clay in the general classes of smectites and attapulgites are suitable for use herein. Other absorbents, such as porous silicas, diatamaceous earth, organic fibrous minerals, which have been pelletized or agglomerated into small particles are also suitable.

The guar gum is mixed with the calcium montmorillonite clay in a ribbon blender or other similar mixing device. The amount of guar gum in the mixture ranges from 0.5 to 2.0 percent by weight of the total blended mixture.

In addition to the PTFE, other functional materials may be added in either liquid or solid form. These include deodorizers, such as fragrances and germicides.

In experimental testing, litter products made in accordance with the present invention experience significantly less dusting than similar clumpable litter products that do not include PTFE additives. In addition, clumps form rapidly with urine, stay hard indefinitely, and are easy to remove. This is advantageous over litters made from sodium montmorillonite, which forms clumps that tend to dry out over time, resulting in clumps that become brittle, break, and are difficult to remove. The combination of these ingredients provides a product that stays well blended and does not readily segregate upon shipping and handling.

Referring to FIG. 1, there is shown an air ladder 10 comprising a housing 12, an inlet port 14 for the clay at the top of housing 12, and a vacuum port 16 attached to a side of housing 18, which is integral with housing 12. A series of laterally disposed baffles 20 are secured to the inner surface of housing 12. Baffles 20 are specifically configured to permit the clay particles to "cascade" down the air ladder. A PTFE application chamber 22 is disposed at the bottom of air ladder 10 and includes an inlet 34 in communication with air ladder 10 and an outlet 26 in communication with a blender 28. Chamber 22 includes a pair of pipes 30 having a plurality of openings or nozzles 31 formed therein. Pipes 30 are connected to a supply of the PTFE dispersion described above. Baffle 32 in chamber 22 directs the clay cascading out of ladder 10 to application area 33 between pipes 30. Blender 28 may be a ribbon blender, an auger-type blender or a hybrid combination of the two.

In operation, a vacuum is applied to port 16 thereby causing an airflow up ladder 20 in the direction of arrow 35 from air inlet 24 to port 16. Clay particles are introduced into port 14 at a predetermined rate. The clay enters port 14 and cascades down ladder 10 in the direction of arrow 36. The flow of air countercurrent to the flow of clay particles picks up the dust emitted from the cascading clay particles and carries the dust out of ladder 10 through port 16. This process reduces some of the dusting in the clay particles as the clay particles exit air ladder 10 and fall into the inlet port 34 of PTFE application chamber 22. Here, the clay particles are guided by baffle 32 into application area 33 between pipes 30. As the clay falls through area 33, it is coated with a PTFE dispersion that flows out of the nozzles 31 of pipes 30. Once the clay is coated, it falls onto a series of parallel bars 40 collectively known as a clod catcher which allows only clay particles of a given maximum size and less to fall through the catcher and out exit 26 into blender 28. The parallel bars of catcher 40 may be spaced ¼ inch apart to prevent particles of a size greater than ¼ inch for use in the final litter product. In blender 28, other additives may be dry blended with the coated clay.

The apparatus illustrated in FIG. 1 is only one possible embodiment of the present invention. Other apparatuses and methods are possible to achieve the desired results. For example, a PTFE dispersion may be sprayed onto the clay particles while the particles are being tumbled in a rotating drum. It is important that the clay particles be in motion during the application of the PTFE so that a maximum surface area is covered by the spray. In addition, premature clumping of the clay is minimized if the PTFE dispersion is sprayed while the clay particles are in motion. Machines that rotate, tumble or otherwise move the clay particles during the spray process could be used.

Figure 2:
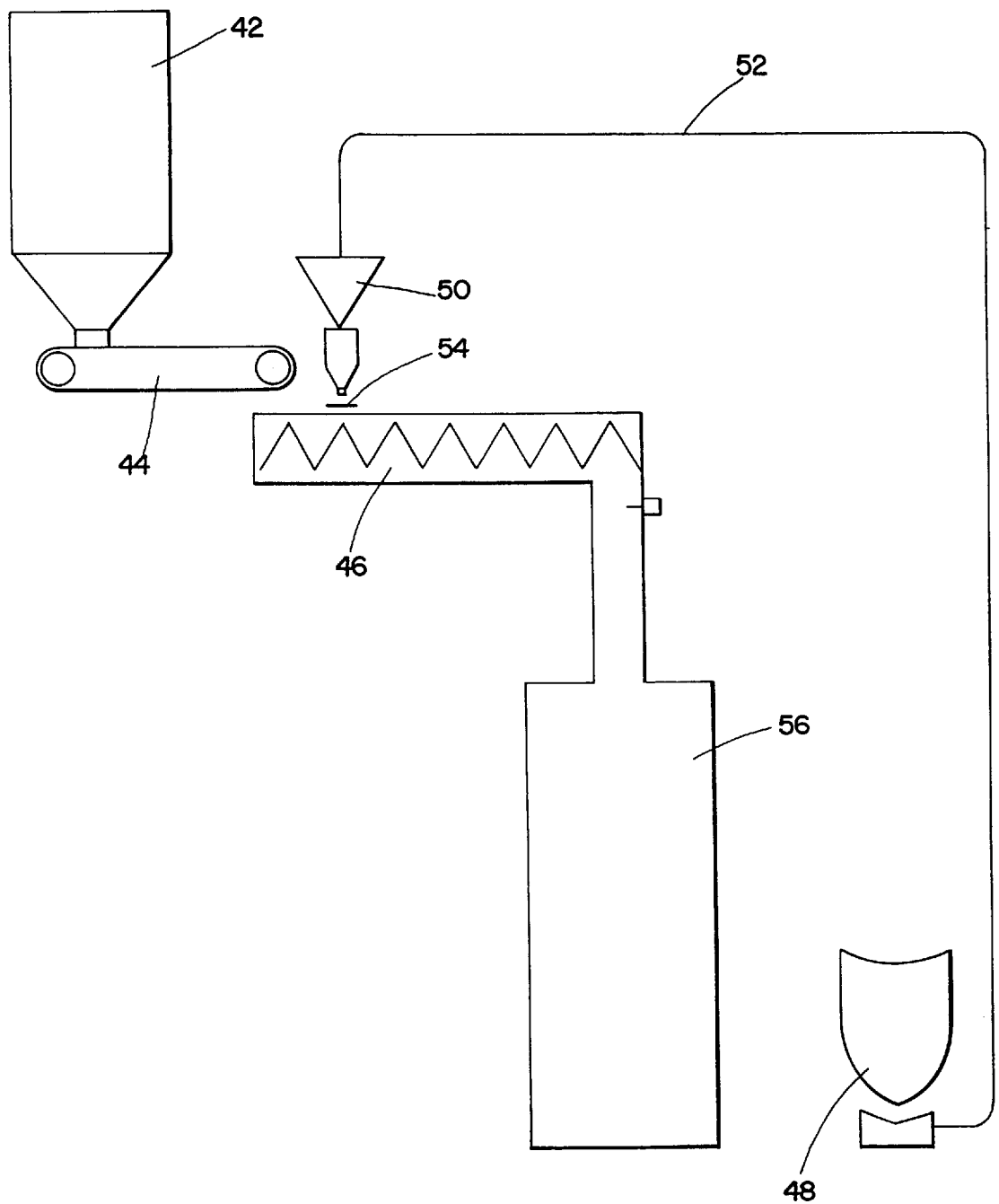
FIG. 2 is a schematic view particularly showing the manner in which the PTFE coated particles are mixed with guar gum as described in one embodiment of the present invention.

FIG. 2 illustrates an arrangement for the blending of a binder such as guar gum with a non-swelling clay that has been coated with PTFE in the manner described in FIG. 1. The PTFE coated clay particles are stored in a holding bin 42 and are introduced to a weigh belt feeder 44 at a given uniform rate. The particles are then fed into a mixing blender 46 for mixing with the guar gum. As shown in FIG. 2, the guar gum is stored in a container 48 and is introduced into a powder feeder 50 by suitable means, such as through a vacuum line 52. Feeder 50 then uniformly provides a given amount of guar gum powder to mixing blender 46. A suitable feeder is an auger-type feeder in which the auger rotates at a given rate to meter the guar gum particles into mixing blender 46. A vibrating screen 54 is provided to prevent the guar gum from inadvertently clumping or "gumming up" prior to entering blender 46. Once thoroughly mixed, the contents of blender 46 is metered into suitable packaging 56 for subsequent shipment.

Other types of mixing apparatuses may be used to blend the binder with the coated clay particulate. The particular type of mixing process shown in FIG. 2 is provided for illustrative purposes only.

It will be appreciated that the foregoing is presented by way of illustration only, and not by way of any limitation, and that various alternatives and modifications may be made to the illustrated embodiment without departing from the spirit and scope of the invention.

What is claimed is:

1. A substantially reduced dusting litter composition capable of agglomerating upon contact with a liquid that is deposited in the composition to facilitate removal of the liquid from a container containing the litter composition, comprising:

a sodium montmorillonite clay; and fibrillatable polytetrafluoroethylene resin distributed on said clay in an amount sufficient to retain dust particles on said clay.

2. The litter composition of claim 1, wherein said resin is present in an amount ranging from 0.2 to 4.0 pounds PTFE solid particles per ton of said clay.

3. The litter composition of claim 1, including a mixture of sodium montmorillonite clay and calcium montmorillonite clay.

4. The litter composition of claim 3, wherein said sodium montmorillonite clay is present in an amount from 50% to 100%, by weight, of the total clay mixture.

5. A substantially reduced dusting litter composition capable of agglomerating upon contact with a liquid that is deposited in the composition to facilitate removal of the liquid from a container containing the litter composition, comprising:

a non-swellable particulate litter substrate;

a particulate binder dispersed throughout said litter substrate in an amount sufficient to enable the composition to agglomerate; and fibrillatable polytetrafluoroethylene resin distributed on said litter substrate in an amount sufficient to retain dust particles on said substrate.

6. The litter composition of claim 5, wherein said binder is guar gum.

7. The litter composition of claim 5, wherein said litter substrate is calcium montmorillonite clay.

8. The litter composition of claim 5, wherein said resin is present in an amount ranging from 0.2 to 4.0 pounds PTFE solid particles per ton of said litter substrate.

9. A method of preparing a substantially reduced dusting litter composition comprising particles of a sodium montmorillonite clay, the method comprising the steps of:

providing a polytetrafluoroethylene dispersion in an amount ranging from one part PTFE to 10 parts water to one part PTFE to 20 parts water;

causing the clay particles to be in motion:

spraying said dispersion onto the clay particles while the particles are in motion to form a random network of fibers about the clay particles to substantially inhibit the amount of airborne dust particles emitted from the clay upon handling.

10. The method of claim 9, wherein the step of spraying includes causing the clay particles to cascade downwardly through an air ladder to reduce some of the dusting of the clay particles, and then spraying the PTFE dispersion onto the clay particles in a chamber at the bottom of the air ladder while the clay particles are dropping through the air.

11. A method of preparing a substantially dust-free litter composition including a particulate liquid absorbent material, the method comprising the steps of:

spraying a sufficient amount of a water dispersion of polytetrafluoroethylene resin onto the liquid absorbent material to form a random network of fibers about the liquid absorbent material to substantially inhibit the amount of airborne dust particles emitted from the liquid absorbent material upon handling; and mixing a binder with the liquid absorbent material in an amount sufficient to enable the liquid absorbent material to agglomerate upon contact with a liquid that is deposited in the liquid absorbent material.

12. The method of claim 11, wherein the binder is guar gum.

13. The method of claim 11, including the step of spraying additional resin onto the liquid absorbent material after the step of mixing the binder with the liquid absorbent material.

14. The method of claim 11, wherein the liquid absorbent material is calcium montmorillonite clay.

15. The method of claim 11, wherein the resin is sprayed at a rate of 0.2 to 4.0 pounds PTFE solid particles per ton of liquid absorbent material.

16. The method of claim 11, wherein the step of spraying further comprises spraying the water dispersion onto particles of the liquid absorbent material as the particles are in motion.

17. The method of claim 16, wherein the step of spraying further comprises spraying the water dispersion onto the particles as the particles are falling through the air.

18. The method of claim 16, wherein the step of spraying further comprises spraying the water dispersion onto the particles as the particles are being tumbled in a container.

\* \* \* \* \*